US008687970B2

(12) United States Patent
Castañon Avila et al.

(10) Patent No.: US 8,687,970 B2
(45) Date of Patent: Apr. 1, 2014

(54) MODULATOR AND DEMODULATOR FOR A DIFFERENTIAL OPTICAL MODULATION FORMAT WITH EIGHT PHASE CHANGES

(75) Inventors: Gerardo Antonio Castañon Avila, Monterrey (MX); Ivan Artiz Aldaya Garde, Ansoain (ES)

(73) Assignee: Instituto Tecnologico y de Estudios Superiores de Monterrey, Monterrey (MX)

( * ) Notice: Subject to any disclaimer, the term of this patent is extended or adjusted under 35 U.S.C. 154(b) by 554 days.

(21) Appl. No.: 12/808,176

(22) PCT Filed: Dec. 1, 2008

(86) PCT No.: PCT/MX2008/000166
§ 371 (c)(1),
(2), (4) Date: Sep. 22, 2010

(87) PCT Pub. No.: WO2009/078695
PCT Pub. Date: Jun. 25, 2009

(65) Prior Publication Data
US 2011/0008054 A1 Jan. 13, 2011

(30) Foreign Application Priority Data
Dec. 14, 2007 (MX) .................... MX/a/2007/016078

(51) Int. Cl.
*H04B 10/00* (2013.01)

(52) U.S. Cl.
USPC ........... 398/140; 398/183; 398/188; 398/202; 398/211

(58) Field of Classification Search
USPC ......... 398/140, 188, 153, 190, 183, 202–204, 398/210, 211
See application file for complete search history.

(56) References Cited

U.S. PATENT DOCUMENTS 6,798,557 B1 * 9/2004 Leven ........................... 359/279
7,233,962 B2 * 6/2007 Summerfield et al. ............ 708/2
(Continued)

FOREIGN PATENT DOCUMENTS

EP 1760912 3/2007

OTHER PUBLICATIONS

Leornardo D Coelho et al, Exact Numberial Evaluation of Optical Receivers Using Advanced Modulation Formats, Transparent Optical Networks, Int'l Conference vol. 1, Jun. 18-22, 2006.

(Continued)

*Primary Examiner* — Daniel Washburn
*Assistant Examiner* — Hibret Woldekidan
(74) *Attorney, Agent, or Firm* — Baker & McKenzie LLP

(57) ABSTRACT

The invention relates to a system comprising an optoelectronic modulator device and demodulator device for establishing communication between optical communication systems by means of differential modulation with eight phase changes. Said system can increase the information transmission capacity by up to three times that of a system with two phase changes. The modulation formats transmittable by the system are called: NRZ-D8PSK, RZ-D8PSK, D8PSK. The invention also relates to the design of the modulator which is formed by a differential modulation precoder and optical signal phase modulators, in which the signals leaving the precoder control the phase modulators in order to perform differential modulation with eight phase changes in relation to the optical signal originating from a semiconductor laser. The invention further relates to the design of a demodulator positioned at the terminal end of the communication system, formed by three receiver branches each containing different electronic devices used for the electronic processing of the signals received.

12 Claims, 19 Drawing Sheets

(56) References Cited

U.S. PATENT DOCUMENTS

| | | | |
|---|---|---|---|
| 7,433,604 B1* | 10/2008 | Kim et al. | 398/188 |
| 7,623,796 B2* | 11/2009 | Liu | 398/202 |
| 7,668,256 B2* | 2/2010 | Giles et al. | 375/300 |
| 7,912,378 B2* | 3/2011 | Tian et al. | 398/185 |
| 8,280,261 B2* | 10/2012 | Castanon Avila et al. | 398/154 |
| 2004/0081470 A1 | 4/2004 | Griffin et al. | |
| 2004/0141222 A1* | 7/2004 | Miyazaki et al. | 359/237 |
| 2004/0250819 A1* | 12/2004 | Blair et al. | 128/899 |
| 2005/0117915 A1 | 6/2005 | Miyazaki et al. | |
| 2006/0263098 A1* | 11/2006 | Akiyama et al. | 398/188 |
| 2007/0047971 A1 | 3/2007 | Ikeuchi et al. | |
| 2007/0071453 A1* | 3/2007 | Liu et al. | 398/183 |
| 2008/0075472 A1* | 3/2008 | Liu et al. | 398/202 |
| 2011/0091221 A1* | 4/2011 | De Gabory et al. | 398/188 |

OTHER PUBLICATIONS

PCT MX 2008/000166 Search Report, Mar. 17, 2009.

\* cited by examiner

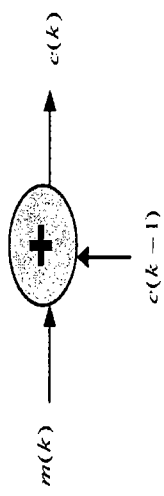
Figure 2
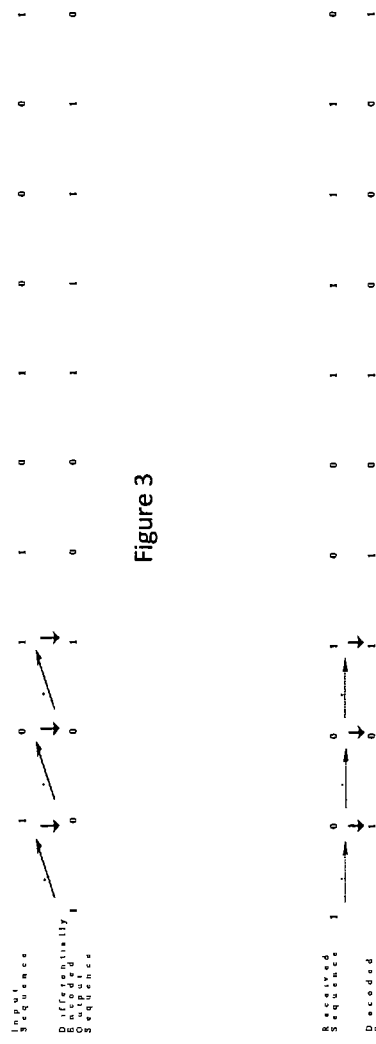
Figure 3
Figure 4

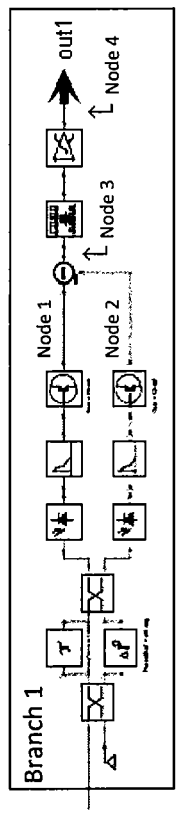
Figure 12 (a)
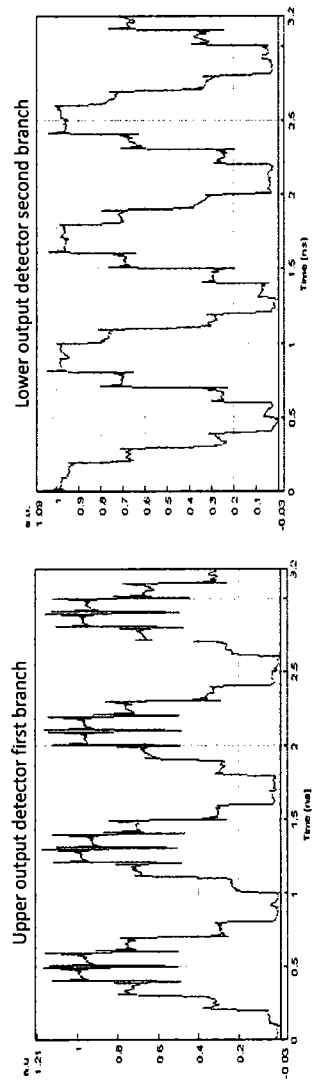
Figure 12 (c)
Figure 12 (b)

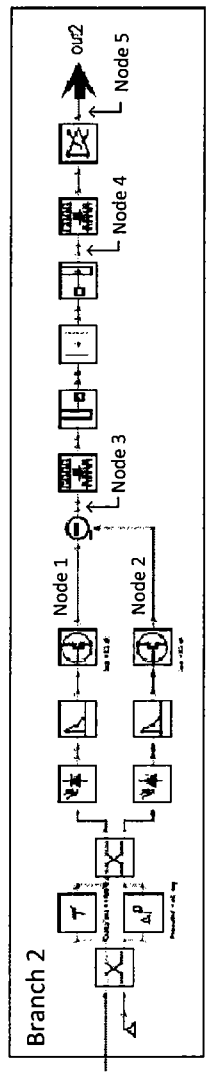
Figure 13 (a)
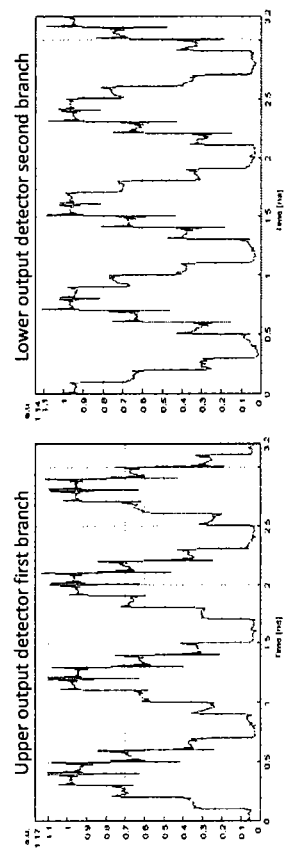
Figure 13 (b)
Figure 13 (c)

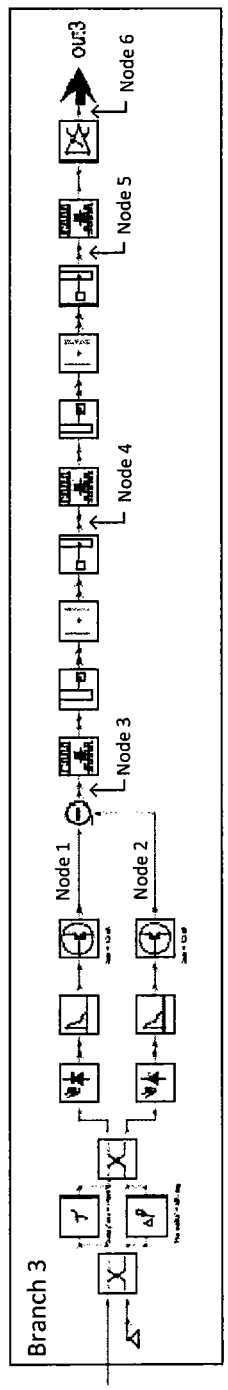
Figure 14 (a)
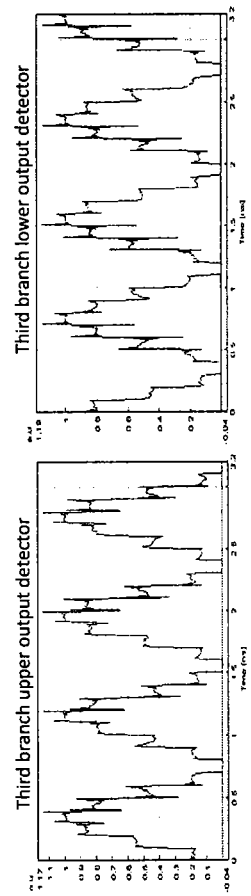
Figure 14 (b)
Figure 14 (c)

MODULATOR AND DEMODULATOR FOR A DIFFERENTIAL OPTICAL MODULATION FORMAT WITH EIGHT PHASE CHANGES

OBJECT OF THE INVENTION

This invention presents a modulator-demodulator capable of increasing up to three times the capacity of communication in a differential optical system with two phase changes which is comprised of a modulator and demodulator device with a differential optical modulation format with eight phase changes.

BACKGROUND

In multichannel optical communication systems are able to use different modulation formats to transmit information over long distances. In digital communication systems the modulation formats use shifts in state such as for example, a shift in the level of the light power transmitted, a shift in the frequency of the light transmitted, and also a shift in the phase of the light transmitted. Generally three basic types of digital modulations differ in terms of the parameter chosen:

ASK Modulation (Amplitude-Shift Keying). In this modulation the carrier is allowed to enter to represent bit 1, and is not transmitted to represent bit 0, digitally modulating the carrier's amplitude.

PSK Modulation (Phase-Shift Keying). The carrier is transmitted to represent 1 and the phase-inverted carrier to represent 0, causing an 180° phase jump in each transition from bit 1 to 0 and from 0 to 1, and for this reason it can be considered a digital modulation of the carrier phase.

FSK Modulation (Frequency-Shift Keying). An $f_{c1}$ frequency carrier is transmitted to represent bit 1 and an $f_{c2}$ frequency to represent bit 0, producing a digital modulation in frequency.

In FIGS. 1(*a*), 1(*b*), and 1(*c*), the basic modulation type of waveforms are shown. FIG. 1(*a*) shows modulation with amplitude shifts. FIG. 1(*b*) shows modulation with phase shifts. FIG. 1(*c*) shows modulation with frequency shifts.

Phase Shift Keying

The Phase Shift Keying (PSK) modulation format and variations thereof, are currently used with frequency in military as well as commercial communication systems. The general analytic expression for PSK is described according to B. Sklar (1988) "Digital Communications: Fundamentals and Applications" (First Edition) New Jersey, Prentice Hall as:

$$s_i(t) = \sqrt{\frac{2E}{T}} \cos[\omega_o t + \phi_i(t)] \text{ for } \begin{matrix} 0 \leq t \leq T \\ i = 1, \ldots, M \end{matrix}$$

where the phase φ(t) end, will have M discrete values, typically expressed as:

$$\phi_i(t) = \frac{2\pi i}{M} \text{ for } i = 1, \ldots, M$$

For example, for the binary PSK (BPSK) in FIG. 1(*b*), M is equal to 2. The symbol E stands for power, T for temporary duration, with 0≤t≤T.

In the BPSK modulation, the signal data to be transmitted are modulated in the wave phase shift, $s_i(t)$, between one of these two states 0(0°) or π(180°). As can be seen in FIG. 1(*b*), the diagram shows one form of the typical BPSK wave with its abrupt phase shifts in the transition of symbols; if the flow of modulated data consists of an alternating sequence of ones and zeros, there would be abrupt shifts at each transition. The waveforms of the signals may be shown as vectors in a polar coordinates diagram; the length of the vector would correspond to the signal amplitude and the direction of the vector; generally speaking, M-ary, corresponds to the signal phase relative to other M−1 signals. In the specific of BPSK, the vector diagram would show the two vectors opposite to the 180° phase. The signals may decay by means of vectors in opposition to the phase called antipodal signals. We will show this vector representation afterwards when the DQPSK diagram is presented.

The PSK modulation format is usually used to obtain a modulation format which allows more sensitive detection mechanisms to be possible within the binary modulation schemes.

Below two different modulation formats are outlined and explained for which the regenerator proposed by this invention may be of application. This is done for the purpose of being able to explain with more clarity afterwards the operating of the phase regenerator de this invention and also the transmission and receiver schemes which make up a multichannel communication system when modulation with phase shifts is used.

There are a great variety of modulation formats that use phase shifts to transmit information. In the following sections we will summarize the most modern modulation formats and on which a great many scientific articles have recently been published. These formats function through phase shifts such as Differential Phase Shift Keying (DPSK) and Differential Quadrature Phase Shift Keying (DQPSK).

Differential PSK Detection (Differential Phase Shift keying (DPSK))

The essence of PSK differential detection is that the identity of the data is referred to phase shifts between one symbol and another. The data are differentially detected examining the signal, where the transmitted signal is primarily differentially coded. In the case of DPSK modulation, the coded bit sequence, c(k), may be, generally speaking, obtained from the following two logical equations:

$$c(k) = c(k-1) \oplus m(k)$$

or $$c(k) = \overline{c(k-1) \oplus m(k)}$$

where the symbol ⊕ represents a sum in module 2 and the overbar shows the logical complement. In said expressions, m(k) stands for the original sequence of data to transmit bit to bit, c(k) stands for the coded bit obtained based on the logical operations indicated by the above equations and c(k−1) refers to the coded bit obtained prior to bit c(k). Afterwards, the information from the coded signal c(k) is translated in a phase shift sequence, θ(k), where bit '1' is characterized by a 180° phase shift and bit '0 ' is characterized by a 0° phase.

It should be mentioned that the differential coding process of a band base bit sequence prior to the modulation constitutes one of the simplest forms of coding as protection against errors. The bit sequences that are transmitted through many of the communication systems may intentionally invert their values within the channel. Many signal processing circuits cannot discern whether any of the bit values transmitted have been inverted or not. This characteristic is known as phase ambiguity. Differential coding is used as protection against this possibility.

Below, the differential coding process is outlined via a numerical example of the information bits prior to being transmitted with the DPSK format.

As has already been mentioned, a differential coding system consists of an addition operation in module two as illustrated in FIG. 2, where c(k)=c(k−1)⊕m(k), is as follows: m(k) sequence of entry data; c(k), bit to bit sequence of coded bits; c(k−1), coded bit obtained prior to c(k).

The manner in which a differential coder operates is described below. Let's consider the bit sequence shown in FIG. 3. The coding circuit described possesses one reference bit which may be either '0' or '1'. The entry bit into the system coder is added to the reference bit, forming the second bit in the sequence of coded data. This bit obtained is added to the next information bit continuing the process described in FIG. 3, such as the Charan Langton reference, "Tutorial 2—What is Differential Phase Shift Keying?".

The decoding process performed in the receiver is the reverse of the process described above. The entry bit sequence is added together for the purpose of recreating the original data sequence as can be seen in FIG. 4. As can be seen, each bit is added to the adjacent bit that has a delay of 1 bit. On the other hand, there also are two possibilities, the bits have been correctly transmitted without producing any errors, and in the opposite case, i.e., the sequence of data received has errors (containing bits whose value has been inverted along the transmission channel) as can be seen in FIG. 5.

The receiver's decoder circuit operates in the following manner, according to Charan Langton, "Tutorial 2—What is Differential Phase Shift Keying?". for each of the two possibilities shown in FIGS. 4 and 5. FIG. 4 shows a sequence of bits received with no errors and in FIG. 5, a sequence of bits is shown that was received with errors. In both cases, the benefit of using differential coding is that it makes it possible to recover the original signal transmitted.

The application of differential coding as phase shift coder arises from obtaining the formats of differential modulation (DPSK, DQPSK . . . ). The scheme of a DPSK detector is shown in FIG. 6 with the corresponding block diagram referred to by Sklar in 1988 as: "Digital Communications: Fundamentals and Applications" First Edition, New Jersey: Prentice Hall.

There are significant differences between the DPSK detector in FIG. 6 and a coherent PSK detector. A coherent PSK detector attempts to correlate the signal phases sent with a reference signal or local oscillator. Correlating the phase of two optical signals is an extremely difficult process. In fact, this synchronization of the phases of two optical signals is the main reason it has not been possible to develop coherent detection systems for commercial equipment phases. In the case of a DPSK detector, the reference signal is simply a delayed version of the signal previously received. In other words, during each symbol time, each symbol received is compared with the previous symbol, and the correlation or anti-correlation between them are observed (180° out of phase).

The DPSK modulation format in contrast with PSK is much less demanding that PSK given that the information is coded as a shift (or absence of shift) in the optical phase of the signal.

DPSK is directly related to the systems with high transmission rates given that the phase fluctuations are reduced between the bits of two signals.

Although non-synchronized demodulation of a PSK signal is not strictly possible because the information resides in the carrier signal phase, detection by comparison of the phase associated with DPSK reduces the problems of synchronization associated with PSK coherent systems.

Format with Quadrature Phase Shift (Quadrature Phase Shift Keying (QPSK))

Reliable behavior of a system, represented by a low probability of error, is one of the important points to bear in mind when designing a digital communication system. Another important characteristic to keep in mind is the efficiency of using band width or spectral efficiency defined as the ratio of bit transmission between the separation between channels (or carriers) in a multichannel system.

In the Quadrature Phase-Shift Keying (QPSK) modulation format, as well as the PSK binary format, the information to transmit is contained in the signal phase that is transmitted.

In particular, the carrier signal phase acquires one of the following phase values, which are spaced an equal distance apart π/4, 3π/4, 5π/4 and 7π/4 radians. For these values, the signal transmitted may be defined according to Simon Haykin, "Communication systems", 4th edition, Ed. John Wiley & Sons, pp. 311 as:

$$s_i(t) = \sqrt{\frac{2E}{T}} \cos(2\pi f_c t + \frac{\pi}{4}(2i-1)), \begin{matrix} 0 \le t \le T \\ i = 1, 2, \ldots, 4 \end{matrix}$$

where E stands for the energy by the symbol of the signal transmitted and T stands for the duration of the symbol. The carrier signal frequency $f_c$ is equal to $n_c/T$ by one fixed integer $n_c$. Each phase value corresponds to a single pair of bits.

Spatial Diagram of the QPSK Signal

By using trigonometric identities and starting with the previous equation, the energy of the signal transmitted $s_i(t)$ may be redefined by the interval 0≤t≤T through the expression defined by Simon Haykin, "Communication systems", 4th edition, Ed. John Wiley & Sons, pp. 311. John Wiley & Sons, pp. 311.

$$s_i(t) = \sqrt{\frac{2E}{T}} \cos(\frac{\pi}{4}(2i-1))\cos(2\pi f_c t) - \sqrt{\frac{2E}{T}} \sin(\frac{\pi}{4}(2i-1))\sin(2\pi f_c t),$$
$$i = 1, 2, \ldots, 4$$

As a result of this representation two fundamental observations may be made:

There are two basic orthogonal functions between them, $\phi_1(t)$ and $\phi_2(t)$, contained in the expression $s_i(t)$. Specifically, $\phi_1(t)$ and $\phi_2(t)$ are defined by a pair of carriers in quadrature, as referenced by Simon Haykin, "Communication systems", 4th edition, Ed. John Wiley & Sons, pp. 311.

$$\phi_1(t) = \sqrt{\frac{2E}{T}} \cos(2\pi f_c t), 0 \le t \le T$$

$$\phi_2(t) = \sqrt{\frac{2E}{T}} \sin(2\pi f_c t), 0 \le t \le T$$

There are four points of information, which are associated with the signal vectors defined according to Simon Haykin, "Communication systems", 4th edition, Ed. John Wiley & Sons, pp. 311, as:

$$s_i(t) = \begin{bmatrix} \sqrt{E}\cos(\frac{\pi}{4}(2i-1)) \\ -\sqrt{E}\sin(\frac{\pi}{4}(2i-1)) \end{bmatrix}, i = 1, 2, \ldots, 4$$

The QPSK format has constellations of two sizes (N=2) and four points of information (M=4). The phase angles of which increase in direction exactly as shown in FIG. 7 according to Simon Haykin, "Communication systems", 4th edition, Ed. John Wiley & Sons, pp. 311.

Like the PSK modulation format, the QPSK possesses a minimum average power.

Differential Quadrature Phase Format Known as DQPSK which is the English Acronym for Differential Quadrature Phase Shift Keying Given that this modulation format constitutes the basis of the research, analysis, and comparison in this invention, the details of the RZ-DQPSK are described below, described by O. Vassilieva, et al in "Non-Linear Tolerant and Spectrally Efficient 86 Gbit/s RZ-DQPSK Format for a System Upgrade" (OFC 2003) and by R. A. Griffin, et al "Optical differential quadrature phase-shift key (oDQPSK) for high capacity optical transmission", *in Proceedings OFC'2002*, pp. 367-368), where an exhaustive description of the architecture of transmitter and receiver schemes is given.

In the DQPSK modulation format, the information is coded in the optical signal phase in such a way that the phase may take one of these four possible values: 0, π/2, π and 3π/2 radians.

Each value of the phase corresponds to one pair of bits, which is the symbol rate, exactly half of the bit rate. This characteristic makes any type of DQPSK format especially interesting because the effective "bit rate" of the transmission (B) only requires the use of B/2 from the electronic symbol rate. For example, it is possible to transmit at a bit rate of 40 G bit per second with electronics that work at 20 G Hertz due to the fact that in each symbol (identified by a phase shift) transmitted, two bits of information are sent.

DQPSK Signal Generation and Detection

In DQPSK modulation format, as in the DPSK format, it is necessary to precode the data in the transmitter to be able to use a simple and direct detection in the receiver. In the case of DQPSK, the necessary precoding function involves the implementation of a logical digital circuit which is considerably more complex than that associated with DPSK. Given that this is a multiphase modulation, with four different phase levels, the precoding function will posses two binary data entries, which will facilitate two outputs with the data that is already coded as described by R. A. Griffin, et al "Optical differential quadrature phase-shift key (ODQPSK) for high capacity optical transmission", *in Proceedings OFC'2002*, pp. 367-368).

Power Spectrum of the RZ-DQPSK Signals

The spectrum of an RZ-DQPSK at the output of a transmission system, as well as its corresponding electrical signal in the receiver, may be observed in FIGS. 8(*a*) and 8(*b*) respectively. In FIG. 8(*a*) we see that the band width occupied by the modulated signal is extremely width. The majority of high capacity optical systems are based on multiplexation in the wavelength to be able to obtain greater transmission rates, wavelength division multiplexing (multiplexing by division of the wavelength). In this way, due to the necessity of multiplexing various channels in the same optical link, each of these needs to be limited in bandwidth. Therefore, it is necessary to make an optical filtration. This optical filtration is carried out in the multiplexors or demultiplexers of an optical system in such a way that the interference of a channel on the others is minimized until it complies with the requirements for interference between channels.

This optical filtration, causes transitory responses due to phase shifts in the modulated signal exactly as shown in FIG. 8(*b*). These transitory responses, in phase as well as in power, deteriorate the reconstruction of the information at the output of the system limiting in this way the maximum capacity of transmission for distance in any given link. The main purpose of the signal regenerator for differential phase signals, presented in this invention, is to mitigate the effect of these transitory responses making a greater transmission capacity possible for the same or greater transmission distance for the same or greater capacity.

It is important to mention that U.S. Pat. No. 6,323,979, describes a regenerator that uses optical phase modulation, using solitons, in a fiber optic transmission system, in which the signal is modulated by a clock. There are many differences regarding this invention, in fact, they are completely different. Note that the modulation format in number U.S. Pat. No. 6,323,979 is by phase distribution, using the sending of solitons, the phase difference between the information contained in the soliton and the signal clock to synchronize the clock in the receiver. These details show that the patent is very different from ours.

BRIEF DESCRIPTION OF THE FIGURES

FIG. 1 (*b*). Basic Form of PSK Digital Transmission.
FIG. 1 (*c*). Basic Form of FSK Digital Transmission.
FIG. 2. DPSK Coding Scheme.
FIG. 3. Digital Example of DPSK Coding.
FIG. 4. Digital Example of DPSK Decoding (Sequence Received without Errors).
FIG. 8 (*b*). Electrical signal received from DQPSK after being optically filtered.
FIG. 12 (*b*). Upper branch 1 electronic amplifier output signal (node 1).
FIG. 12 (*c*). Lower branch 1 electronic amplifier output signal (node 2).
FIG. 12 (*d*). Branch 1 differential electrical output signal (node 3).
FIG. 12 (*e*). Electrical output signal to the branch 1 limiting amplifier output (node 4).
FIG. 13 (*b*). Upper branch 2 electronic amplifier output signal (node 1).
FIG. 13 (*c*). Lower branch 2 electronic amplifier output signal (node 2).
FIG. 13 (*d*). Branch 2 differential electrical output signal (node 3).

FIG. 13 (e). Electrical output signal after the absolute value signal generator (node 4).

FIG. 13 (f). Electrical output signal to the branch 2 limiting amplifier output (node 5).

FIG. 14 (b). Upper branch 3 electronic amplifier output signal (node 1).

FIG. 14 (c). Lower branch 3 electronic amplifier output signal (node 2).

FIG. 14 (d). Branch 3 differential electrical output signal (node 3).

FIG. 14 (e). Electrical output signal after the first absolute value signal generator (node 4).

FIG. 14 (f). Electrical output signal after the second absolute value signal generator (node 5).

FIG. 14 (g). Electrical output signal to the branch 3 limiting amplifier output (node 6).

FIG. 15 (b). Branch 1 electrical output and its corresponding binary sequence.

FIG. 15 (c). Branch 2 electrical output and its corresponding binary sequence.

FIG. 15 (d). Branch 3 electrical output and its corresponding binary sequence.

FIG. 15 (e). Table showing the optical signal gap $\Delta\phi$, O8DPSK with the demodulator electrical output signal levels, $s_1(t)$, $s_2(t)$, $s_3(t)$.

FIG. 19 (b). D8PSK signal eye with regeneration at 400 km.

FIG. 19 (c). D8PSK signal eye with regeneration at 600 km.

FIG. 20 (b). EOP results versus residual dispersion.

FIG. 20 (c). EOP results versus differential group delay.

FIG. 20 (d). EOP results versus transmission power.

DETAILED DESCRIPTION OF THE INVENTION

The modulator-demodulator system proposed in this invention is described below.

A. Modulator

Figure 1A:
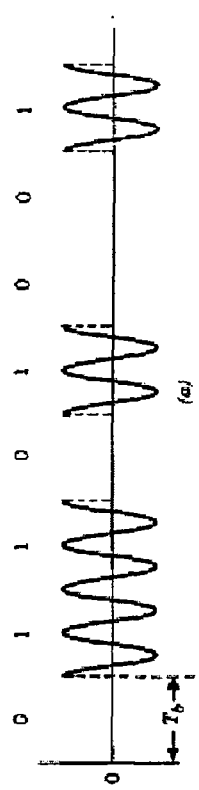
FIG. 1. (*a*). Basic Forms of ASK Digital Transmission.
Figure 1B:
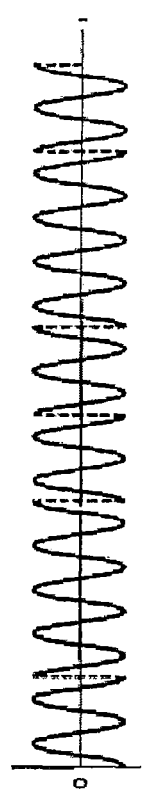
Figure 1C:
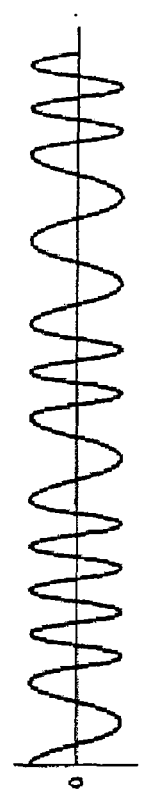
Figure 5:
FIG. 5. Digital Example of DPSK Decoding (Sequence Received with Errors).
Figure 6:
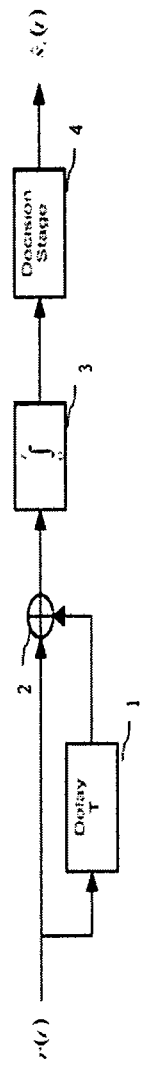
FIG. 6. Block Diagram of a Differential Detector.
Figure 7:
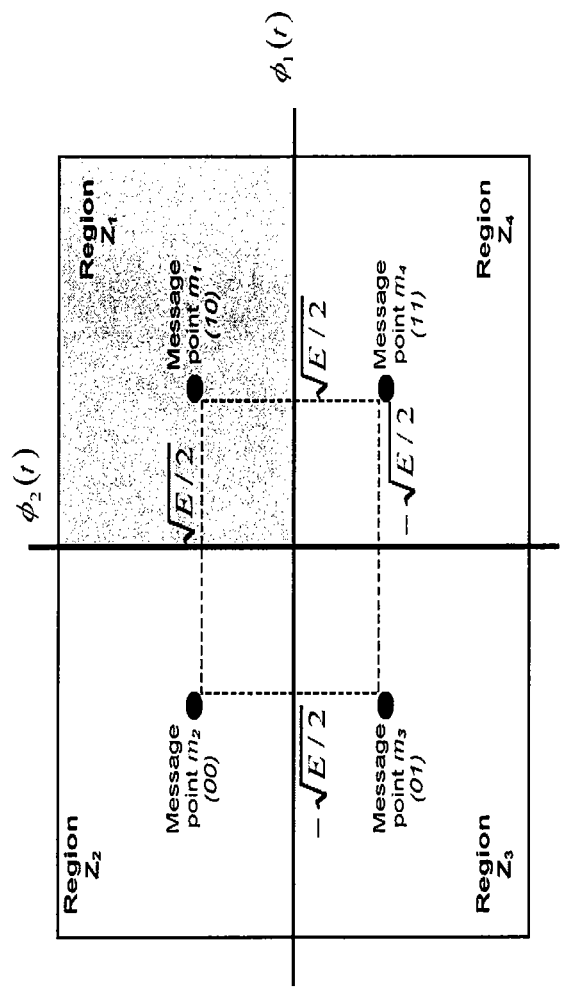
FIG. 7. Phase Diagram for a QPSK System.
Figure 8:
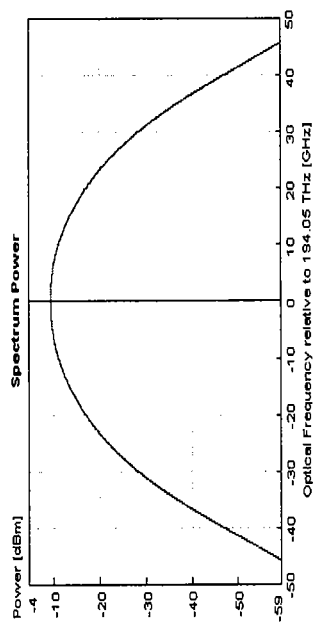
FIG. 8 (*a*). Signal Spectrum for DQPSK.
Figure 8:
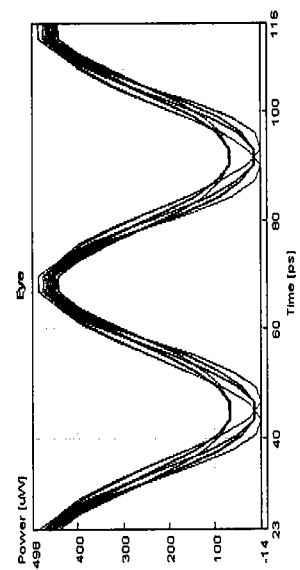
Figure 9:
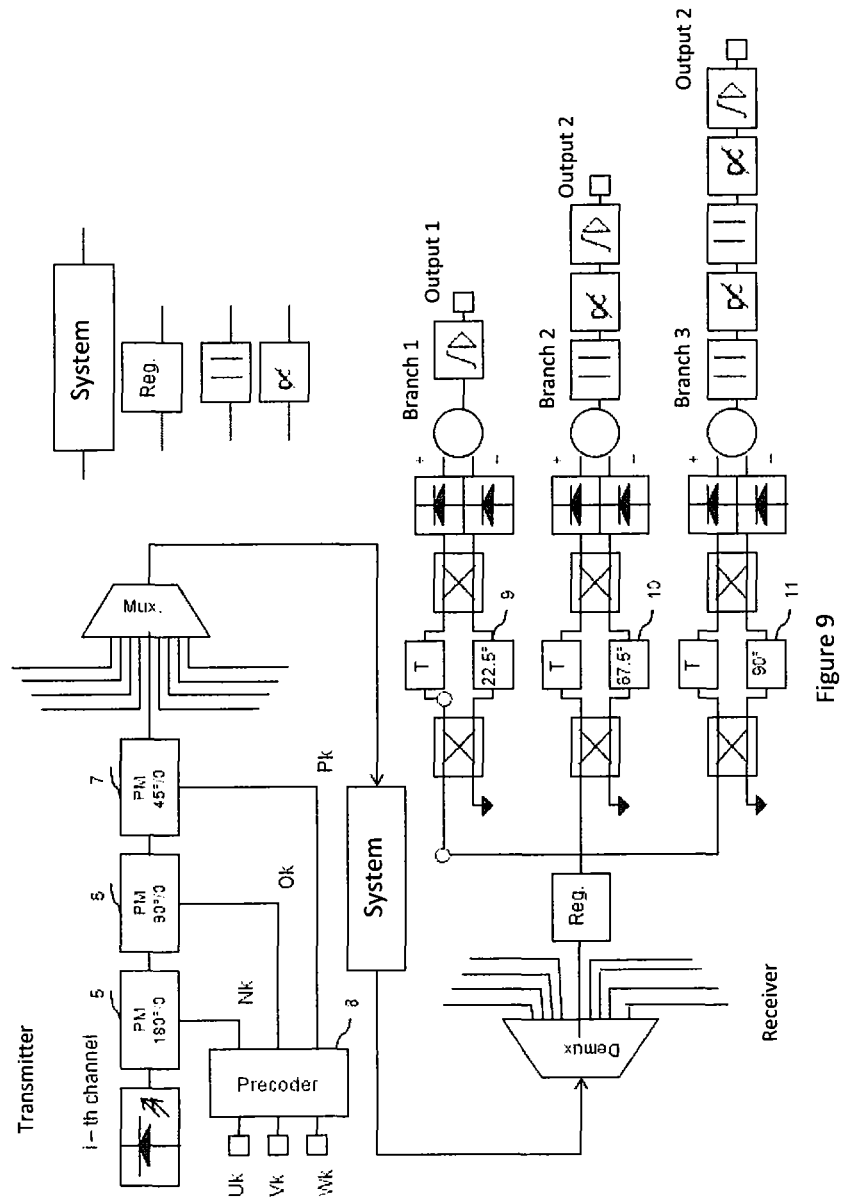
FIG. 9. Block Diagram of the Modulator and Demodulator of an O8DPSK system.

In FIG. 9, the architecture for the modulation scheme is shown. It contains an optical differential phase shift keying (OD8PSK or alternatively 8DPSK) modulator made up by three cascade phase modulators (5, 6, 7) where each of these introduces a certain gap in accordance with its corresponding information signal. The gaps are 180 °/0, 90°/0, 45°/0.

Figure 10:
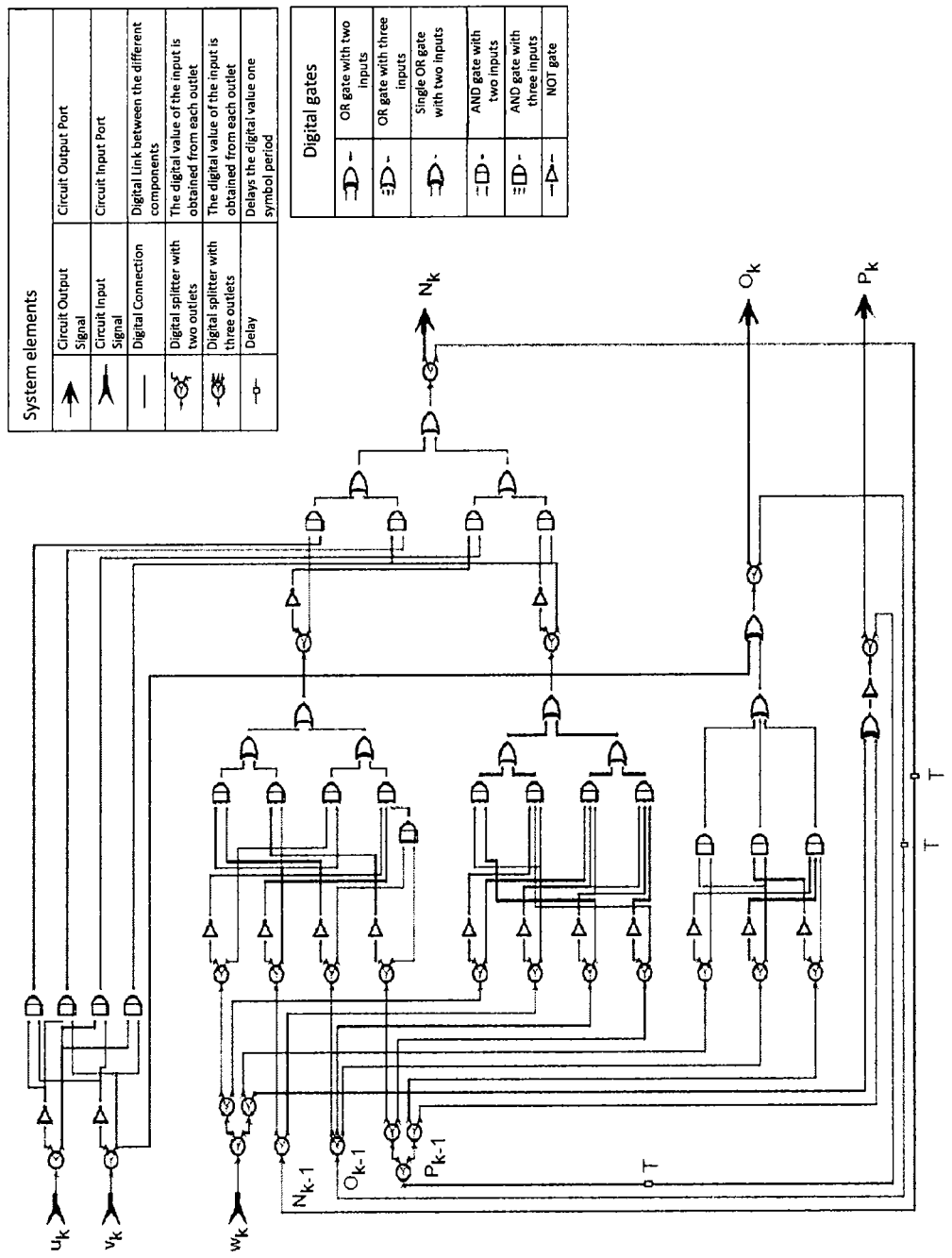
FIG. 10 Differential precoder with three entries and three exits.

Modulator entry signals are obtained through the precoder shown (8) and that is shown in its complete form in FIG. 10. This precoder implements differential modulation based on the following logical equations.

$$\delta_1 = \overline{P_{k-1}} \cdot \overline{u_k} \cdot v_k \cdot w_k + u_k \cdot \overline{v_k} + u_k \cdot \overline{w_k} + P_{k-1} \cdot u_k \quad (1)$$

$$\delta_2 = \overline{u_k} \cdot \overline{v_k} \cdot \overline{w_k} + P_{k-1} \cdot \overline{u_k} \cdot \overline{v_k} + \overline{P_{k-1}} \cdot u_k \cdot w_k + u_k \cdot v_k \quad (2)$$

$$\delta_3 = \overline{P_{k-1}} \cdot \overline{v_k} \cdot w_k + P_{k-1} \cdot v_k + v_k \cdot \overline{w_k} \quad (3)$$

$$N_k = \overline{N_{k-1} \cdot O_{k-1}} \cdot \delta_1 + \overline{N_{k-1}} \cdot O_{k-1} \cdot \delta_2 + N_{k-1} \cdot \overline{O_{k-1}} \cdot \overline{\delta_1} + N_{k-1} \cdot O_{k-1} \cdot \overline{\delta_2} \quad (4)$$

$$O_k = \overline{N_k \cdot O_k} \cdot \delta_3 + \overline{N_k} \cdot O_{k-1} \cdot \overline{\delta_3} + N_{k-1} \cdot \overline{O_{k-1}} \cdot \delta_3 + N_{k-1} \cdot O_{k-1} \cdot \overline{\delta_3} \quad (5)$$

$$P_k = \overline{P_{k-1} \oplus w_k} \quad (6)$$

Where $u_k$, $v_k$, $w_k$, are the entry bit sequences and $N_k$, $O_k$, $P_k$ are the bits exiting the precoder. The k−1 sub-indices indicate a delay in a symbol period. $\delta_1$, $\delta_2$, $\delta_3$ are auxiliary signals. The symbol $\oplus$ represents the exclusive binary operation OR, + represents OR and • represents AND. Said logical equations have been checked using digital simulation.

B. Demodulator

Figure 11:
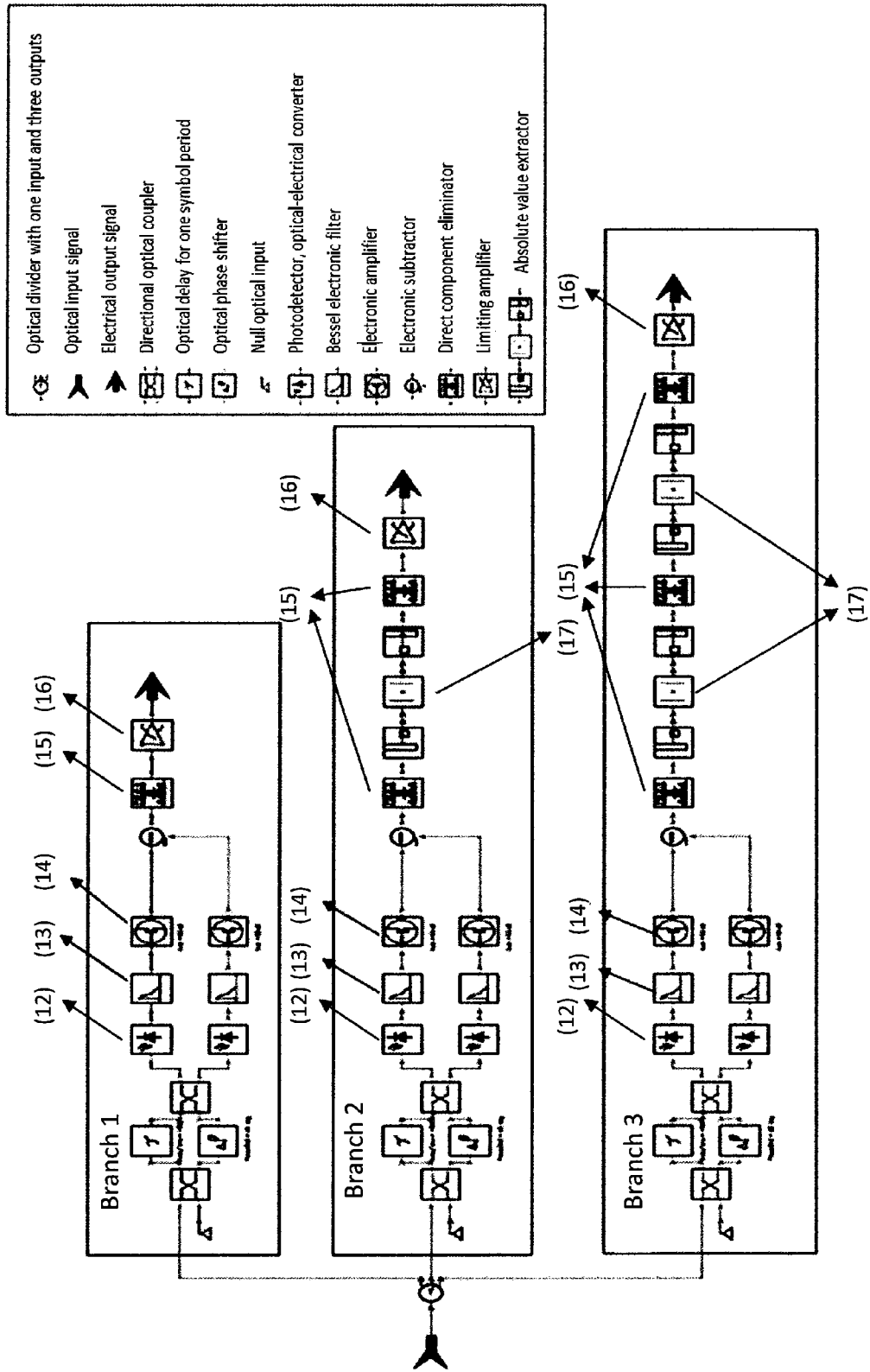
FIG. 11. Block Diagram of the Complete O8DPSK Demodulator.

As may be seen in FIG. 9 and in detail in FIG. 11, the demodulator is based on three parallel Mach Zenhder interferometers (9, 10, 11) the gaps of which are different for each of the branches. For branch 1, the required gap is 22.5°=/8 radians (9), for the second branch it is 67.5°=3/8 radians (10) and for the third branch it is 90°=/2 radians (11). Each interferometer is followed by an electronic conditioning phase in charge of generating three mutually independent OOK signals from the demodulator input signal. An important characteristic of 8DPSK optical modulation is that the optical signal cannot decay as the sum of the quadrature optical signals as occurs in ODQPSK.

In each of the branches the first signal processing stage is the exit signal conditioning of the photodetectors (12) using a low pass filter which eliminates the out-of-band thermal and shot noises induced by the photodetectors (12). Consequently an appreciable increase is obtained in the signal-to-noise ratio of the electrical exit signal. In our case, third-order Bessel filters (13) were used with a cut-off frequency of 20 GHz. After the signals from each branch are filtered they are amplified through electronic amplifiers (14) to later calculate the balance signal. That is to say, the differential signal of each pair of photodetectors on each branch.

Once the balanced electrical signals are obtained, the processing required in each branch to obtain the three independent output signals varies.

Figure 12:
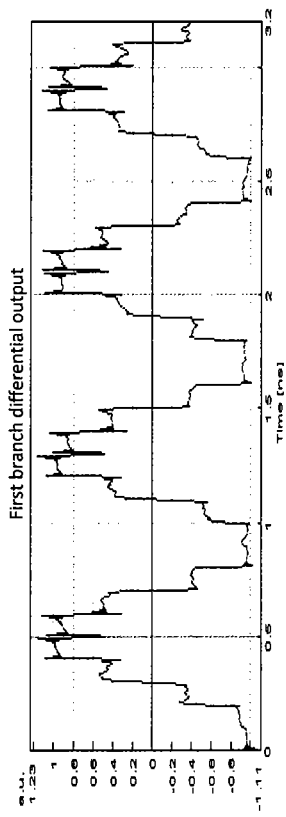
FIG. 12 (*a*). Details of the O8DPSK Demodulator: branch 1.
Figure 12:
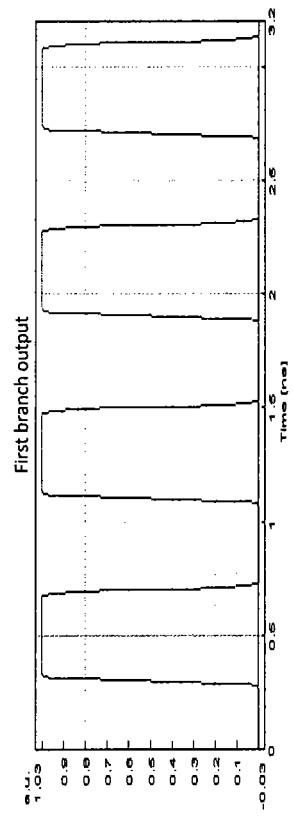

In FIG. 12 (a), branch 1 of the 8DPSK demodulator is shown in detail. The signals shown in the FIG. 12 (b) and FIG. 12 (c) represent the electrical output from the upper ($z_1$) and lower ($z_2$) photodetectors in branch 1, respectively in nodes 1 and 2, while FIG. 12 (d) represents the differential signal, node 3.

This is processed through a direct component eliminator (14) and a limiting amplifier (15) the exit (out$_1$) of which, in node 4, is one of the independent signals sought. This last signal may be represented mathematically as:

$$out_1 = \begin{cases} 1 & \text{if } z_1 - z_2 - \{DC\} > 0 \\ 0 & \text{if } z_1 - z_2 - \{DC\} < 0 \end{cases} \quad (9)$$

Where −{DC} stands for subtraction of the continuous signal component.

Figure 13:
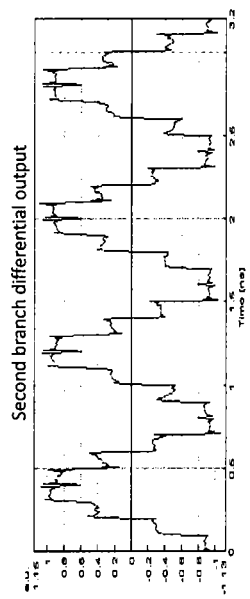
FIG. 13 (*a*). Details of the O8DPSK Demodulator: branch 2.
Figure 13:
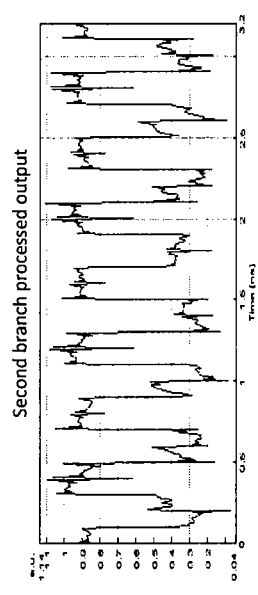
Figure 13:
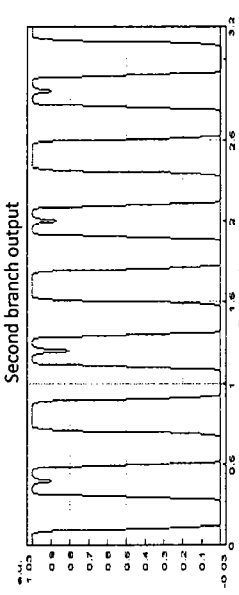

FIG. 13 (a) is the branch 2 of the 8DPSK demodulator. FIG. 13 (b) and FIG. 13 (c) as well as FIG. 13 (d) are the signals in nodes 1, 2, and 3 of branch 2 and are equivalent to those explained in the previous branch. The continuous or direct component (15) is eliminated afterwards, the absolute value signal (17) is extracted and the continuous component (15) is eliminated again. Finally, the signal is amplified using the same limiting amplifier model as in branch 1, obtaining from in node 4 of branch 2 the signal shown in FIG. 13 (*e*). As occurs in the $out_1$ signal, the output signal of the second $out_2$ branch, FIG. 13 (*f*), may be written mathematically as:

$$out_2 = \begin{cases} 1 & \text{if } |(z_1 - z_2) - \{DC\}| - \{DC\} > 0 \\ 0 & \text{if } |(z_1 - z_2) - \{DC\}| - \{DC\} < 0 \end{cases} \quad (10)$$

As in the first branch, $-\{DC\}$ indicates the elimination of the continuous signal component. $\|$ stands for the extraction of the absolute value signal.

Figure 14:
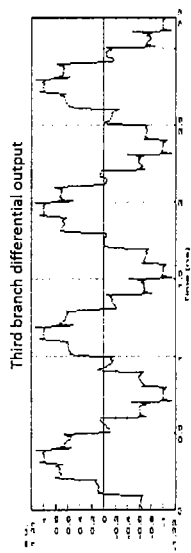
FIG. 14 (a). Details of the O8DPSK Demodulator: branch 3.
Figure 14:
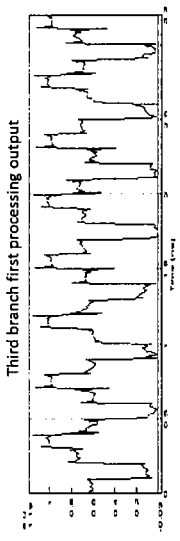
Figure 14:
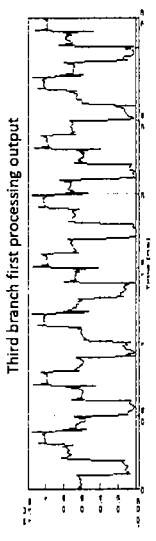
Figure 14:
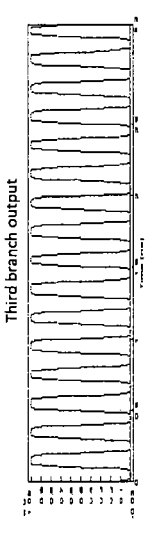

The processing that should be implemented to obtain the third independent signal is equivalent to that carried out in branch 2 with the inclusion of a second calculation stage for the absolute value signal extractor (17) and the subtraction of the direct component (15). In this way, FIG. 14 (*a*) represents the third of the branches, FIG. 14 (*b*) is the upper photodetector electrical output (node 1), the FIG. 14 (*c*) is that of the lower (node 2), the FIG. 14 (*b*) is the differential output of branch 3 (node 3), the FIG. 14 (*e*) is the signal after the first of the DC component elimination stages and the procurement of the signal module (node 4), FIG. 14(*e*) is the signal after the second of the stages and FIG. 14 (*f*) corresponds to the electrical output of the limiting amplifier ($out_3$). In this way, by using the signal processing in the electrical domain, a second Mach Zehnder interferometer may be dispensed with. The last signal may be written as:

$$out_3 = \begin{cases} 1 & \text{if } \|(z_1 - z_2 - \{DC\})| - \{DC\}| - \{DC\} > 0 \\ 0 & \text{if } \|(z_1 - z_2 - \{DC\})| - \{DC\}| - \{DC\} < 0 \end{cases} \quad (11)$$

Where the symbols used are the same as the mathematical representation of the signal ($out_2$).

Figure 15:
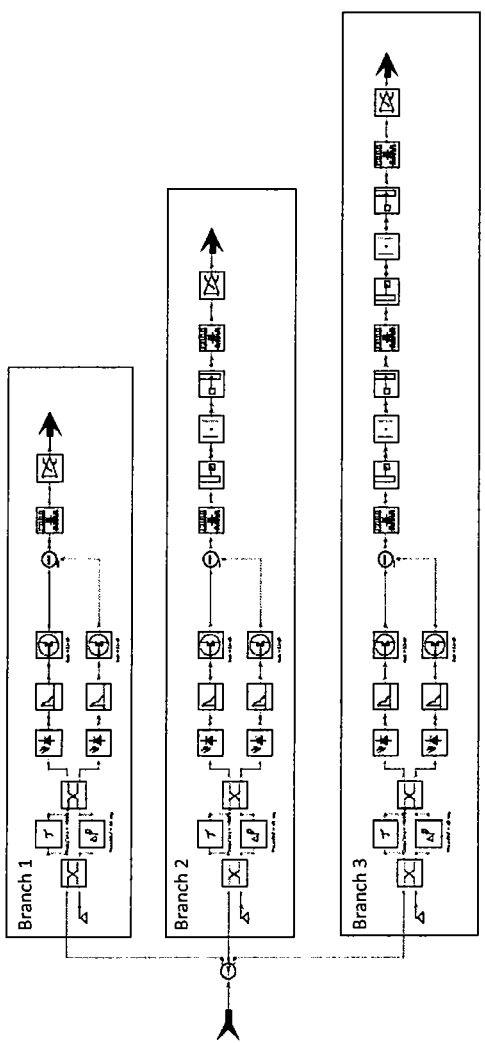
FIG. 15 (a). O8DPSK Demodulator Scheme.
Figure 15:
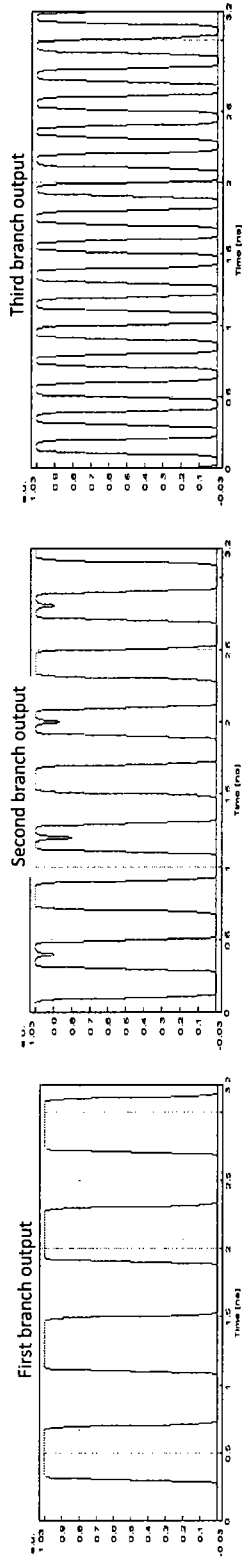

In FIG. 15 (*a*) the complete demodulator diagram is shown again. The Figures, FIG. 15 (*b*), FIG. 15 (*c*), and FIG. 15 (*d*) show the output for branches 1, 2, and 3 respectively together with their corresponding binary sequences. On the other hand, the optical signal gap may be obtained from the entries from the phase modulators of the modulator, that are the output of the differential precoder. The input signal to the phase modulators has been chosen so that it scans all possible gap levels from 0 to 315°. In this way, Table 1 was able to be created (FIG. 15 (*e*)) in which the relationship between the gap in the optical signal is established and the output of the demodulator. The three exits of the demodulator will be independent if and only if a one-to-one relationship can be created between the optical signal gaps and the bit sequence of the output. Which is clearly seen in the Table of FIG. 15 (*e*):

For any two different optical gap values, triple output bits are different.

All the possible combinations of three bits appear.

In this way the independence of the output is tested and consequently, no information is lost from the system.

Results from the Phase Regenerator for Differential Modulation Formats with Phase Changes.

Figures 15, 16:
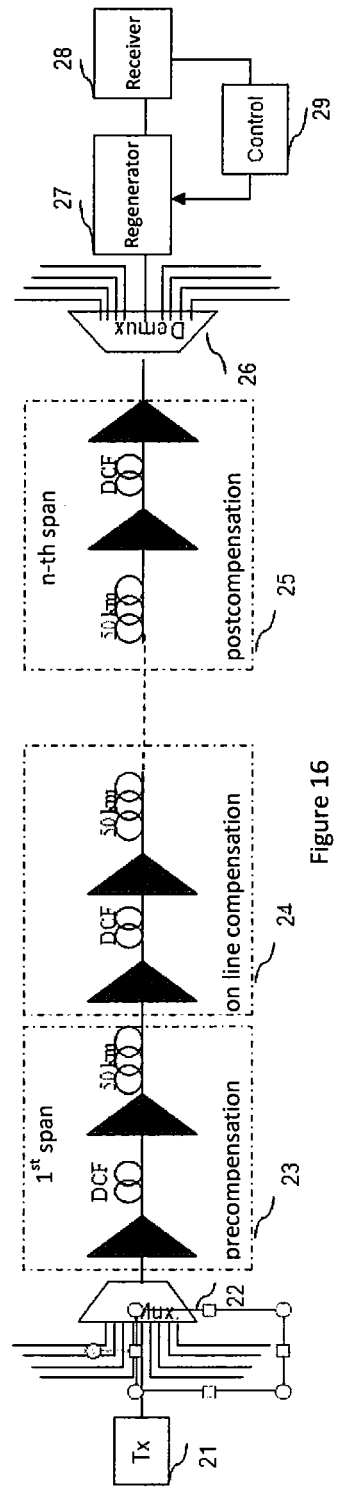
FIG. 16. Optical fiber channel scheme used.

The system of optical transmission used in the simulations is presented in FIG. 16 in which the different transmission sections is shown divided by the optical amplifiers. To test the operation of the system, twelve frames are used which involves a total transmission distance of 600 km.

As is known, one of the principal effects that limit an optical transmission system is chromatic scattering. Due to the problem of chromatic scattering, we should minimize residual chromatic scattering in order to obtain greater transmission rates. To reduce residual scattering, scatter-compensation schemes are applied for the purpose of making residual scattering or scattering at the end of the transmission system as low as possible.

Figure 17:
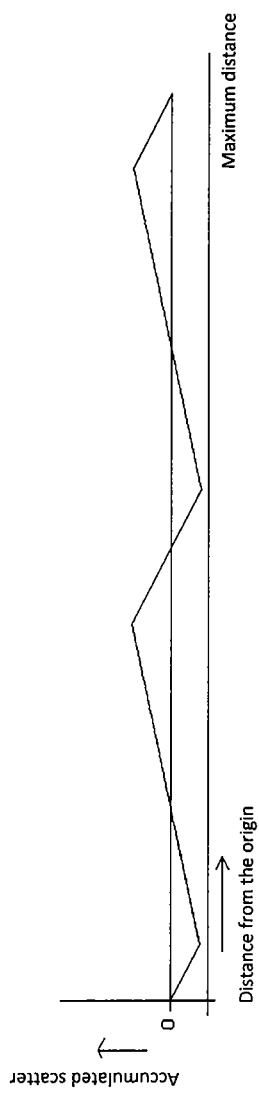
FIG. 17. Optical communication system scatter plot.

To compensate for chromatic scattering what is proposed is to use the pre-compensation (23), on-line compensation (24), and post-compensation (25) strategy. For the pre-compensation stage, we compensate the 30% from scattering of a monomode fiber segment at the beginning and the remaining 70% at the end in the post-compensation stage. On-line compensation frames compensate 100% of the scatter from monomode fiber. FIG. 17 shows the scatter plot strategy used in this invention. As may be seen in the figure, the purpose of this scatter plot is so that residual scattering will be zero at the end.

Figure 18:
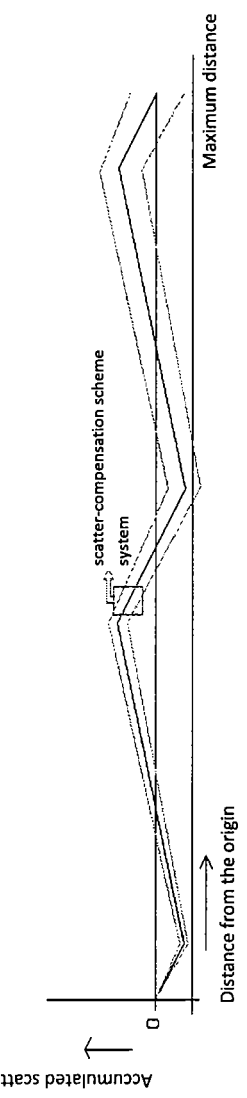
FIG. 18. Accumulated scattering for diverse channels.

This scatter-compensation scheme has been widely used by different technologies, however, it only nullifies scattering for the central channel, the channels that are at the ends of a multi-channel system do not have null-scattering. Scattering is greater when the distance (frequency) is greater to the central channel and scattering is also greater when the transmission distance is greater as shown in FIG. 18. In FIG. 18, residual or accumulated scattering is shown for different channels on the same fiber optic, the central curve corresponding to the central channel and the remaining corresponding to the channels on the ends.

There are various strategies to resolve this problem of residual scattering for channels that are far from the central frequency in a multi-channel communication system. A solution of high velocity systems is to use variable channel scatter compensation for the effected channels. This scheme adds more cost to the transmission system and one should try and avoid this, however there are cases where it is necessary to implement it.

Fibers Used:

The fibers used are shown in Table 2. There is information on monomode transmission fiber and also compensating fiber transmission.

TABLE 2

Basic Parameters of the Fibers Used

| | Monomode Non-Null Scatter Fiber | Scatter Compensating Fiber |
|---|---|---|
| Attenuation (dB/km) | 2 | 5 |
| D (s/m^2) | 8.00E−06 | −9.00E−05 |
| S (s/m^3) | 6.00E+01 | −6.50E+02 |
| Aeff (m^2) | 6.50E−11 | 1.93E−11 |
| Nlcoef (m^2/W) | 2.60E−20 | 4.30E−20 |

Channel Bandwidth and Separation Between Channels

To prove feasibility of this invention we used nine channels of transmission placed in the transmission frequencies recommended by the ITU. The separation between channels that we used was 50 GHz. Optical filters used in the simulations for the multiplexers and demultiplexers have a third-order Gaussian function. The bandwidth of these filters were optimized for the different modulation formats used and we ensured that the filters would not produce interference between channels greater than 25 dBm. That is to say, we made sure that the filter bandwidth would first comply with the separation between channels and also that the optical filter would be sufficiently narrow so that it would not produce significant interference to the adjacent channels.

Figure 19:
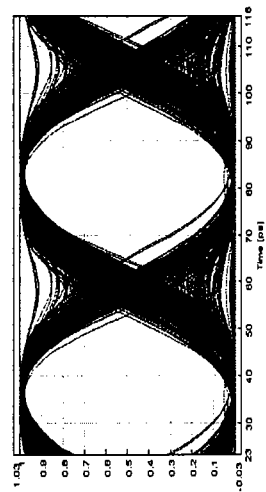
FIG. 19 (a). D8PSK signal eye after the transmitter, i.e., 0 km.
Figure 19:
Figure 19:
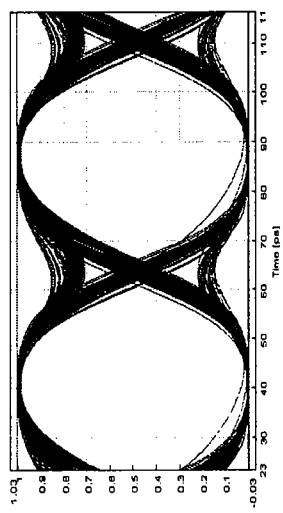

FIGS. 19 (a), 19 (b), and 19 (c), show results of the opening the signal eye for the D8PSK modulation format at 0 km, 400 km, and 600 km respectively. In D8SK 3 bits of information per symbol are transmitted. For example, if we consider that the symbol ratio is 21.5 GHz, then the bit ratio is 3×21.5=64.5 Gbit/s. The separation between channels is 50 GHz and then the system has a spectral efficiency of 1.2 bits/s/Hz. The filters used in the simulation for the multiplexor and demultiplexer have a third-order Gaussian function and a bandwidth of 32 GHz to 3 dB with respect to the peak. The FIG. 19, show the opening of the signal eye with the regenerator of the patent NL/a/2006/000103 operating.

One of the advantages of the D8PSK modulation format is that more information bits per symbol may be transmitted, however this merits 8 possible phase changes. When there are more levels in the phase, the non-linear effects of the transmission system greatly affect this modulation format.

In these FIGS. 19(a), 19(b), and 19(c)) it may be seen that the regenerator in association with the modulator/demodulator system makes transmission distances of 400 km possible (FIG. 19 (b)) and 600 km (FIG. 19 (c)) with a completely open signal eye.

Figure 20:
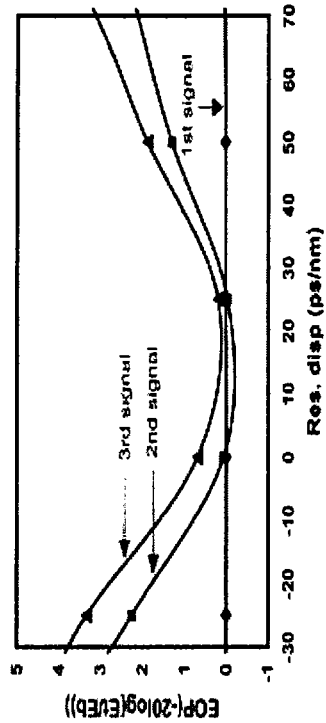
FIG. 20 (a). D8PSK results, Q factor versus OSNR.
Figure 20:
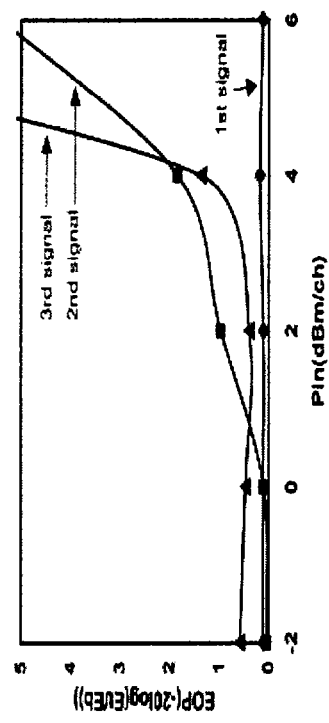
Figure 20:
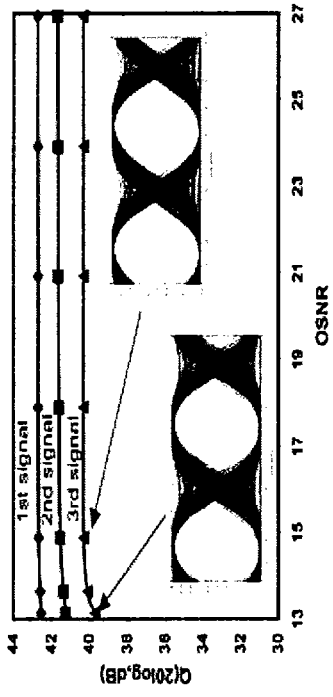
Figure 20:
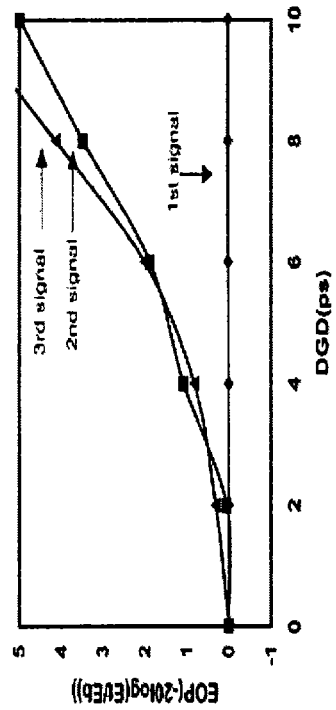

FIGS. 20(a), 20(b), 20(c), and 20 (d) show the results of the D8SK modulation format at 64.5 Gbit/s. Please note that FIG. 20 (a) shows the results from the three output signals obtained after remodulating the D8PSK signal. This Figure shows the results of the Q factor in terms of the optical signal to noise ratio signal (OSNR). Please note that the results show an excellent Q factor when the OSNR is 13.1 dB. However, it can be seen in the eye diagram that there are some lines that make the eye close at this same OSNR of 13.1 dB for the third signal. Note that the majority of the high level lines or "1" open the eye very well, however, there are 2 lines that degrade the signal eye. The consequence of this is that the signal eye is not 100% reliable and that it is necessary to set an OSNR limit of 15 dB of OSNR when the eye is shown fully open. In FIG. 20 (b) the results of the chromatic scattering impact are shown.

To obtain these results a transmission distance of 600 km is used and a transmission power of −2 dBm for monomode fiber transmission. A pseudo random sequence of $2^{31}$ bits were used in the simulation. Also it was proven that the output signal of the decoders were equal to the input signals. If one considers as a limit, an eye penalty of 0.5 dB, then, the third signal has a range for residual scattering of 35 ps/nm. Results of the polarization mode scattering is another parameter to be analyzed. FIG. 20 (c) shows the results for three output signals from the modulators. The third and second signals give the worst results because greater electronic procession is required to obtain them. Results of the operation of the regenerator with respect to the non-linearity of the fiber are shown in FIG. 20 (d) where we have the eye penalty versus the signal power.

This Figure presents the results of the central channel of a system with nine channels. As is known, the central channel in a multi-channel system is the one that suffers the most from the effect of mixing four waves and it is for this reason that only the results from the central channel are shown, i.e., the worst case scenario.

The invention claimed is:

1. A Modulator and Demodulator System for a Differential Optical Modulation Format with Eight Phase Changes (SDPSK) comprising:
a modulator comprising three cascade phase modulators (5, 6, 7) and a precoder (8); and a demodulator comprising three branches with parallel Mach-Zehnder interferometers (9, 10, 11), wherein each interferometer is followed by a conditioning stage and electronic signal processing to recover transmitted signals;
wherein the first branch of the demodulator contains a balanced electro-optical detection using two photodetectors (12), followed by a conditioning and a direct component eliminator (15) and a limiting amplifier (16), wherein the conditioning stage consists of a third order 20-GHz low-pass Bessel electronic filter (13) and an electronic amplifier (14);
wherein the second branch of the demodulator contains a balanced electro-optical detection using two photodetectors(12), followed by a conditioning stage and a direct component eliminator (15), an absolute value signal extractor (17), and another direct component eliminator (15), wherein the conditioning stage consists of a third order 20-GHz low-pass Bessel electronic filter (13) and an electronic amplifier (14);
wherein the third branch of the demodulator has a balanced electro-optical detection using two photodetectors (12), followed by a conditioning and a direct component eliminator (15), an absolute value signal extractor (17), a second direct component eliminator (15), a second absolute value signal extractor(17), and a third direct component eliminator(15), wherein the conditioning stage consists of a third order 20-GHz low-pass electronic Bessel filter (13) and an electronic amplifier (14).

2. The Modulator and Demodulator System for a Differential Optical Modulation Format with Eight Phase Changes according to claim 1, wherein the precoder (8) receives as an input three electric signals that contain the information to be communicated and modifies them according to the logical equations:

$$\delta_1 = \overline{P_{k-1}} \cdot \overline{u_k} \cdot v_k \cdot w_k + u_k \cdot \overline{v_k} + u_k \cdot \overline{w_k} + P_{k-1} \cdot u_k$$

$$\delta_2 = \overline{u_k} \cdot \overline{v_k} \cdot \overline{w_k} + P_{k-1} \cdot \overline{u_k} \cdot \overline{v_k} + \overline{P_{k-1}} \cdot u_k \cdot w_k + u_k \cdot v_k$$

$$\delta_3 = \overline{P_{k-1}} \cdot \overline{v_k} \cdot w_k + P_{k-1} \cdot v_k + v_k \cdot \overline{w_k}$$

$$N_k = \overline{N_{k-1}} \cdot \overline{O_{k-1}} \cdot \delta_1 + \overline{N_{k-1}} \cdot O_{k-1} \cdot \delta_2 + N_{k-1} \cdot \overline{O_{k-1}} \cdot \overline{\delta_1} + N_{k-1} \cdot O_{k-1} \cdot \overline{\delta_2}$$

$$O_k = \overline{N_k} \cdot \overline{O_k} \cdot \delta_3 + \overline{N_k} \cdot O_{k-1} \cdot \overline{\delta_3} + N_{k-1} \cdot \overline{O_{k-1}} \cdot \delta_3 + N_{k-1} \cdot O_{k-1} \cdot \overline{\delta_3}$$

$$P_k = \overline{P_{k-1} \oplus w_k}$$

wherein $u_k$, $v_k$, $w_k$, are the entry bit sequences and $N_k$, $O_k$, $P_k$ are the bits exiting the precoder, the k−1 sub-indices indicate a delay in a symbol period, $\delta_1$, $\delta_2$, $\delta_3$ are auxiliary signals and the symbol $\oplus$ represents the exclusive binary operation OR, + represents OR and • represents AND.

3. The Modulator and Demodulator System for a Differential Optical Modulation Format with Eight Phase Changes according to claim 1, wherein the precoder (8) has as an output three interconnected electrical signals to three optical phase modulators 180° (5), 90° (6) and 45° (7) placed in series, where a signal that exits from a laser semiconductor transmitter is modulated with phase changes produced by the phase modulators, and wherein the phase modulators are controlled by signals that exit the precoder.

4. The Modulator and Demodulator System for a Differential Optical Modulation Format with Eight Phase Changes according to claim 1, wherein the precoder (8) has as an input three electrical signals that contain digital information to be transmitted and said information is electronically coded through the precoder to create three output signals with differential coding.

5. The Modulator and Demodulator System for a Differential Optical Modulation Format with Eight Phase Changes according to claim 1, wherein the modulator further comprises an ability to produce optical modulations with eight phase changes called D8PSK, RZ-D8PSK, or NRZ-D8PSK.

6. The Modulator and Demodulator System for a Differential Optical Modulation Format with Eight Phase Changes according to claim 1, wherein the demodulator with three branches applies gaps that differ in each of the branches; for the first branch, the required gap is 22.5°=π/8radians (9), for the second branch it is 67.5°=π/8 radians (10), and for the third branch it is 90°=π/2 radians(11).

7. The Modulator and Demodulator System for a Differential Optical Modulation Format with Eight Phase Changes according to claim 1, wherein each branch of the demodulator carries out electronic processing responsible for generating three OOK signals which are mutually independent from each other and from an input signal to the demodulator.

8. The Modulator and Demodulator System for a Differential Optical Modulation Format with Eight Phase Changes according to claim 1, wherein each branch of the demodulator processes a signal using a direct component eliminator (15) and a limiting amplifier (16).

9. The Modulator and Demodulator System for a Differential Optical Modulation Format with Eight Phase Changes according to claim 1, wherein the first branch of the demodulator produces an output, out1, that may be represented mathematically as:

$$out1 = \begin{cases} 1 & \text{if } z_1 - z_2 - \{DC\} > 0 \\ 0 & \text{if } z_1 - z_2 - \{DC\} < 0 \end{cases}$$

wherein $-\{DC\}$ stands for subtraction of the continuous signal component and z1 and z2 are the outputs of the photodetectors (12) in the first branch of the demodulator.

10. The Modulator and Demodulator System for a Differential Optical Modulation Format with Eight Phase Changes according to claim 1, wherein the second branch of the demodulator produces an electronic output, out2, that may be represented mathematically as:

$$out2 = \begin{cases} 1 & \text{if } |(z_1 - z_2 - \{DC\})| - \{DC\} > 0 \\ 0 & \text{if } |(z_1 - z_2 - \{DC\})| - \{DC\} < 0 \end{cases}$$

wherein $-\{DC\}$ indicates the elimination of the direct signal component and $\|$ stands for the extraction of the absolute value signal, and z1 and z2 are the outputs of the photodetectors (12) in the second branch of the demodulator.

11. The Modulator and Demodulator System for a Differential Optical Modulation Format with Eight Phase Changes according to claim 1, wherein the third branch of the demodulator processes a signal after obtaining a difference from the transmitted signals.

12. The Modulator and Demodulator System for a Differential Optical Modulation Format with Eight Phase Changes according to claim 1, wherein the third branch of the demodulator produces an electronic output, out3, that may be represented mathematically as:

$$out3 = \begin{cases} 1 & \text{if } ||(z_1 - z_2 - \{DC\})| - \{DC\}| - \{DC\} > 0 \\ 0 & \text{if } ||(z_1 - z_2 - \{DC\})| - \{DC\}| - \{DC\} < 0 \end{cases}$$

wherein $-\{DC\}$ indicates the elimination of the direct signal component and $\|$ stands for the extraction of the absolute value signal, and z1 and z2 are the outputs of the photodetectors (12) in the third branch.

\* \* \* \* \*